(No Model.)
F. KRUEGERMANN.
AXLE.
No. 429,726. Patented June 10, 1890.
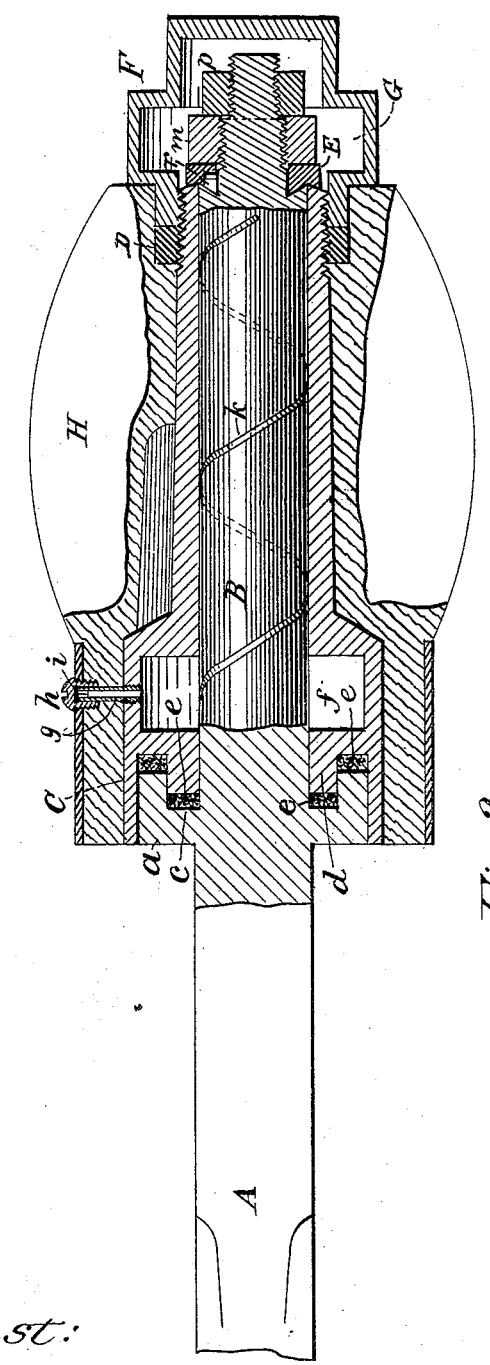
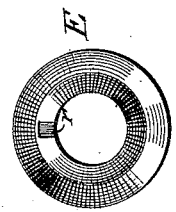
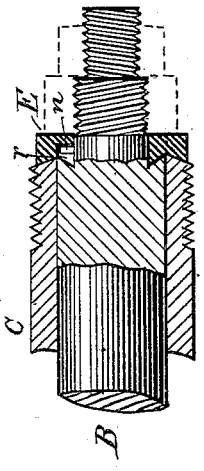
Attest:
J. H. Schott
G. B. Towles.
Inventor
Friedrich Kruegermann
By H. A. Daniels
Atty

UNITED STATES PATENT OFFICE.

FRIEDRICH KRUEGERMANN, OF BETHLEHEM, PENNSYLVANIA.

AXLE.

SPECIFICATION forming part of Letters Patent No. 429,726, dated June 10, 1890.

Application filed January 24, 1890. Serial No. 338,026. (No model.)

*To all whom it may concern:*

Be it known that I, FRIEDRICH KRUEGERMANN, a citizen of the United States, residing at Bethlehem, in the county of Lehigh and State of Pennsylvania, have invented certain new and useful Improvements in Axles for Vehicles; and I do hereby declare the following to be a full, clear, and exact description of the invention, such as will enable others skilled in the art to which it appertains to make and use the same.

The invention relates to axles for vehicles; and it consists in certain improvements in the construction of the same and parts connected therewith, as hereinafter described and claimed.

In the accompanying drawings, Figure 1 represents a longitudinal section of an axle provided with my improvements. Fig. 2 represents parts of spindle, axle-box, and grooved cap or washer. Fig. 3 is a detail view.

A designates an axle of a vehicle provided with the spindle B, at the inner end of which is formed a collar $a$, in which is formed an annular recess $c$. The outer end of the spindle is screw-threaded and reduced in size, as shown, one part of the threaded portion having a right and the other part a left hand screw-thread.

C indicates the axle-box, the inner end of which is enlarged and constructed to extend over the collar $a$ of the spindle. The axle-box is provided with an internal annular flange $d$, which forms an annular recess, into which the annular flange of the collar extends, the flange $d$ extending into the recess $c$ of the collar. Suitable packing $e$ may be placed in the annular recesses of the collar $a$ and the axle-box. An annular chamber $f$ is formed in the axle-box to surround the spindle B and contain lubricating matter, which is received into the chamber through a small fixed tube $g$, which is screwed to the axle-box, and is squared inside at the top for receiving a wrench. This tube $g$ is closed by means of a hollow screw-plug $h$, which may be screwed into the hub H, so that it closes over the upper end of the tube, the plug being provided with packing $i$, which is closed against the upper end of the tube when the plug is screwed down. A spiral groove $k$ is made in the spindle B for conducting the lubricating-oil along the spindle. The sleeve of the axle-box extends along the spindle, and is threaded on its outward end, on which is screwed a threaded collar D.

E indicates a washer or perforated cap, which is placed on the spindle, and is provided with an annular V-shaped groove to receive and close against the end of the axle-box, which is beveled, and a shoulder of the spindle, which is also inwardly beveled, as shown, the cap E thus formed fitting closely on the end of the box and the shoulder of the spindle. The cap E is kept from turning by a fixed pin $n$ on the spindle, said pin extending into a recess $r$ in the cap when the latter is in place. The cap E is secured by a nut $m$ on the spindle, and is further secured by another nut $p$, the two nuts being, respectively, on the right and left hand threaded portions.

F designates a screw-cap, which is placed at the outer end, being screwed to the axle-box and partly inclosed by the hub of the wheel. The cap F is provided with an annular chamber G to contain lubricating matter for the cap E. The axle-box is set in the hub for the wheel, and all parts of the spindle are fully guarded and the lubrication of the axle is complete.

I claim—

1. The combination, with an axle provided with a spindle which has an inwardly-beveled shoulder at its outer end, as shown, of an axle-box which is beveled at its outer end, a perforated cap or washer provided with a V-shaped groove and a securing-nut, the said perforated cap fitting against the beveled end of said axle-box and the inwardly-beveled shoulder of said spindle, substantially as and for the purpose described.

2. The combination, with an axle-spindle provided at its outer end with a fixed pin $n$ and with an inwardly-beveled shoulder, as shown, of an axle-box which is beveled at its outer end, a perforated cap E, provided with a V-shaped groove and a recess $r$, said cap being closed against the beveled end of said axle-box and the inwardly-beveled shoulder of the spindle, securing-nuts on said spindle, and a screw-cap F, provided with a chamber G, the said cap F being connected with the axle-box and inclosing cap E, substantially as set forth and described.

In testimony whereof I have affixed my signature in presence of two witnesses.

FRIEDRICH KRUEGERMANN.

Witnesses:
EDWARD KOLB,
PHILIP MAURO.